United States Patent [19]
Nordsiek et al.

[11] 3,816,358

[45] June 11, 1974

[54] VULCANIZABLE RUBBER MIXTURES

[75] Inventors: Karl-Heinz Nordsiek; Roland Streck, both of Marl, Germany

[73] Assignee: Chemische Werke Hals Aktiengesellschaft, Marl, Germany

[22] Filed: June 22, 1972

[21] Appl. No.: 265,167

[30] Foreign Application Priority Data
June 24, 1971 Germany............................ 2131354

[52] U.S. Cl..................... 260/4 R, 152/357, 260/5, 260/23 R, 260/42, 260/32, 260/23.7 M, 260/23.7 R, 260/33.6 AQ, 260/79.5 C, 260/79.5 B, 260/887, 260/890, 260/897 R

[51] Int. Cl......... C08d 9/08, C08c 9/14, C08c 9/04

[58] Field of Search.................... 260/4 R, 93.1, 889

[56] References Cited
UNITED STATES PATENTS

| | | | |
|---|---|---|---|
| 3,639,371 | 2/1972 | Marshall et al................... | 260/93.1 |
| 3,660,369 | 5/1972 | Kormer et al...................... | 260/93.1 |
| 3,732,338 | 5/1973 | Theisen et al. .................... | 260/93.1 |

*Primary Examiner*—Wilbert J. Briggs, Sr.
*Attorney, Agent, or Firm*—Millen, Raptes & White

[57] ABSTRACT

Vulcanizable rubber mixtures having improved room temperature hardness containing 2–20% by weight, calculated on the rubber, of a polyoctenamer or polydodecenamer.

14 Claims, No Drawings

VULCANIZABLE RUBBER MIXTURES

BACKGROUND OF THE INVENTION

This invention relates to vulcanizable rubber mixtures, more particularly vulcanizable mixture of elastomeric and thermoplastic polymers of high thermoplasticity and improved green-strength, to a method for improving the hardness of unvulcanized rubber mixtures and to articles of manufacture produced therefrom.

The synthetic vulcanizable rubbers normally exhibit too low green-strength. They do not possess the "stamina" of natural rubbers, which frequently results in problems in the processing operation for the production of elastomeric products. Furthermore, along with the requirement that the pre-formed, unvulcanized articles be stable, increased mixture hardness at room temperature is often desirable.

Thus, it is an absolute prerequisite for a large number of processing operations that the unvulcanized rubber mixture have a high degree of thermoplasticity. This means that the hardness thereof, for example, defohardness (defo) measured according to German Industrial Standard DIN 53 514 at 20° C. should be relatively high, but at the processing temperature, which is normally above 80° C., should be within the normal range or therebelow. In this way, processing operations are simplified on the one hand and on the other hand, the article produced therefrom, e.g., a tire or a part thereof, alters its shape at most to an insubstantial extent during the intermediate storage until the shape is set by vulcanization.

In principle, this objective can be attained by adding thermoplastic polymers to the vulcanization mixture, whose fusion temperature and/or glass point are between the storage temperature and the processing temperature. Examples of such polymers are polystyrene and styrene-enriched butadiene-styrene copolymers. However, these polymers impair the dynamic properties of the vulcanizates, so that such mixtures are unsuitable for the production of articles subjected to strongly varying mechanical stresses, e.g., automobile tires.

To a certain extent, these undesired consequences can be avoided by the addition of polyethylene. However, besides the high softening point of such polymers, because there is no possibility of covulcanization, polyethylenes also do not provide a successful solution of the problem described above.

It is an object of the present invention to improve the disadvantages of the above-described state of the art, i.e., to provide vulcanizable rubber mixtures which, in the unvulcanized condition, exhibit the desired pronounced thermoplasticity without adversely affecting the dynamic properties of vulcanizates produced therefrom.

SUMMARY OF THE INVENTION

The vulcanizable elastomers of this invention contain 2–20 percent by weight, preferably 5–15 percent by weight, based on the elastomer, or a polyoctenamer, a polydodecenamer, or a mixture thereof, whose double bonds are more than 60 percent in the transconfiguration and have a reduced viscosity at 135° C., of 0.2–3.0 dl./g.

DETAILED DISCUSSION

The polyalkenamers employed on the compositions of this invention, i.e., polyoctenamer and polydodecenamer, can be produced in a conventional manner from cyclooctene and cyclododecene, respectively, by ring-opening polymerization in solution in the presence of a mixed catalyst containing a compound of a metal of Sub-groups 5 through 7 and a metal of Main Groups 1 through 4 of the Periodic Table, or a compound thereof, as well as optional additional activators.

The proportion of double bonds in the trans-configuration in these polyalkenamers must be more than 60 percent, preferably between 75 and 95 percent, and they must have a reduced specific viscosity of 0.2 – 3.0 dl./g. at 135° C. (in "Decalin" decahydronaphthalene). For illustrative methods of preparing such polymers, see, e.g., Scott, Calderon, Ofstead, Judy and Ward, Rubber Chemistry and Technology, 44 (1971), 1341 and the references cited therein.

Vulcanizable rubbers whose processing properties can be improved include all natural and synthetic polymers and mixtures thereof which are elastomers, e.g., natural rubbers, synthetic rubbery polymers, including homo- and copolymers of butadiene, isoprene and 2-chlorobutadiene, e.g., BR (polybutadiene rubber), IR (polyisoprene rubber), SBR (styrene-butadiene rubber), NBR (nitrile-butadiene rubber), CR (polychloroprene rubber), and copolymers of at least two $\alpha$-olefins and optionally one more multiens, i.e., polyunsaturated olefins, e.g., EPM (ethylene-propylene rubber) and EPDM (ethylene-propylene-diene rubber).

The exact amount of polyalkenamer employed in the compositions of this invention depend on the hardness of the unmodified elastomer and desired hardness of the unvulcanized mixture at room temperature. Generally, about 2–20 percent, preferably 5–15 percent, by weight of polyoctenamer and/or polydodecenamer, calculated on the elastomer, is employed. For example, to double the defo hardness of the finished mixture, about 10 percent by weight, calculated on the elastomer, of the trans-polyoctenamer or -polydodecenamer, is normally sufficient.

The herein-described auxiliary agents can be added to conventional rubber pre-vulcanizate mixtures in customary processing assemblies used in the rubber industry, with the prerequisite that a processing temperature of greater than 70° C. is employed during this treatment. Normally, the mixing step can be performed, without special operating procedures, simultaneously with the incorporation of fillers and other components during the production of the basic mixture by a rolling mill or internal mixer.

Without any limitation, all types of active and inactive fillers customary in the rubber industry can be present in the vulcanizable rubber compositions of this invention, e.g., carbon blacks, silicic acid, kaolin, etc., optionally with the simultaneous utilization of plasticizers, especially aromatic, naphthenic, and paraffinic mineral oils. It is, of course, possible to employ the conventional adjuvants, e.g., anti-aging agents and cross-linking agents, for the production of specific vulcanizates.

The thus-prepared mixtures exhibit advantageous behavior during the further processing within the scope of the preparation of shaped articles of manufacture, due to their improved flow properties. The considerable increase in tensile strength at room temperature in the unvulcanized compositions which results by the incorporation of the polyalkenamer is of special advantage, so that the finishing steps during the production of rubber goods are favorably affected.

Of paramount significance is the use of the additives to be employed according to this invention in the storage of pre-formed unvulcanized articles or blanks until vulcanization. The thus-obtained extraordinary prolongation of the minimum storage stability ensures high dimensional stability and thus substantially precludes troublesome problems arising in the course of the manufacturing processes of many rubber articles. During the production of articles wherein a high dimensional accuracy is required, such as, for example the manufacture of belted tires, the vulcanizable compositions of this invention can advantageously be employed, due to the high dimensional stability in the raw condition.

The addition of the polyoctenamer and/or polydodecenamer during the processing of rubber mixtures with high proportions of plasticizer and also to rubbers having relatively low molecular weights is particularly advantageous. Thus, advantages are clearly apparent wherever especially soft rubbery pre-polymerizates, e.g., those having a deformation hardness (DIN 53514) at 20° C. in unmodified form of less than 6,000, less than 4,000, preferably 2,000–4,000, pass through the manufacturing procedure, which provide savings and facilitate many processing steps during the mixing and shaping which usually involve considerable difficulties because of the lack of dimensional stability due to increased flow tendency. Here, the additives to be used according to this invention permits fully exploiting the economical advantages having mixtures of low-viscosity during processing, i.e., deformation hardness at 20° C. is usually increased at least 50% more than 4,000, e.g., about 5,000–9,000.

The cross-linking vulcanization reaction can be conducted in presses, autoclaves, etc., and does not require special measures or devices. Using conventional vulcanization systems, practically unchanged heating periods result, based on the temperature customarily considered an optimum for the respective mixture.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Using an internal mixer (type GK 2; shell temperature 50° C.; speed of front rotor 50 r.p.m.), additives customarily employed for the production of vulcanizates were incorporated into known rubbers. The mixing time was 5 minutes. The temperature of the material upon discharge varied between 115° and 140° C. The thus-produced basic unvulcanized mixture contained, in each case, 50 parts by weight of HAF (high abrasion furnace) carbon black, 8 parts by weight of processing oil with a high content of aromatics, 3 parts by weight of zinc oxide, 2 parts by weight of stearic acid, and 1 part by weight of a discoloring anti-aging agent, respectively, based on 100 parts by weight of the rubber. The tensile strength and the thermoplasticity, measured according to defo (DIN 53 514), of the unvulcanized samples were measured and compared to these same properties of a second series of these mixtures which additionally contained 10 parts by weight, based on the rubber content, of a polydodecenamer having a trans-1,4-content of 75 percent and a RSV-value of 0.8 dl./g. The results are set forth in Table I. In addition to the increase in raw tensile strength which is, in part, very pronounced, a surprisingly strongly distinct increase in the defo hardness at 20° C. is observed in each sample to which was added the polydodecenamer. Plasticity in the processing temperature range is unchanged or somewhat lower.

TABLE 1

| | RUBBER | POLY-DODECEN-AMER | RAW TENSILE STRENGTH kg./cm$^2$ | ELONGA-TION % | DEFO ACC. to DIN 53 514 | |
|---|---|---|---|---|---|---|
| | | | | | 20°C. | 80°C. |
| 1a | Natural Rubber | | | | | |
| 1b | Sheets Defo 1200 | None | 4.0 | 276 | 3000/25 | 680/11 |
| | do. | 10 Parts by Wt. | 10.1 | 304 | 7000/30 | 580/11 |
| 1c | Synthetic Polyisoprene (Ziegler Type) Commercial Product "Natsyn" 2200 | None | 1.8 | 176 | 2000/9 | 500/5 |
| 1d | do. | 10 Parts by Wt. | 3.3 | 190 | 4600/15 | 400/5 |
| 1e | Synthetic Polyisoprene Li Type, Commercial Product "Cariflex" IR 305 | None | 1.7 | 81 | 2200/11 | 600/5 |
| 1f | do. | 10 Parts by Wt. | 2.9 | 60 | 4800/15 | 600/6 |
| 1g | SBR 1500 | None | 4.1 | 120 | 5400/23 | 1400/22 |
| 1h | SBR 1500 | 10 Parts by Wt. | 5.5 | 119 | 8000/24 | 1180/23 |

TABLE 1—Continued

| RUBBER | POLY-DODECEN-AMER | RAW TENSILE STRENGTH kg./cm² | ELONGA-TION % | DEFO ACC. to DIN 53 514 | |
| --- | --- | --- | --- | --- | --- |
| | | | | 20° C. | 80° C. |
| 1i cis-1,4-Poly-butadiene Commercial Product "Buna" CB 10 | None | 2.6 | 536 | 2700/32 | 1700/26 |
| 1j do. | 10 Parts by Wt. | 3.9 | 317 | 4300/35 | 1500/27 |

EXAMPLE 2

Following the procedure of Example 1, elastomer mixtures were once again prepared, employing various types of rubber. The proportion of filler in this case was 70 parts by weight of HAF carbon black, and the proportion of plasticizer was 40 parts by weight of aromatic extender oil. In a second series of mixtures 15 parts by weight, based on the rubber, of a polyoctenamer with a trans-1,4-content of 85% and a RSV-value of 1.1 dl./g. was admixed to improve the raw tensile strength and thermoplasticity. The results of the testing of the properties of the mixtures is set out in Table 2. In each case, in addition to an increase in raw tensile strength, a considerable rise in defo hardness at room temperature is achieved with the level at 80° C. being maintained in the samples containing the polyoctenamer.

EXAMPLE 3

To the following elastomeric mixture, which is suitable, for example, for the production of articles subjected to high dynamic stresses, is admixed 0, 10 and 15 parts by weight, respectively, of polydodecenamer (trans-1,4-content = 70%; RSV = 0.5 dl./g.):

| | Parts |
| --- | --- |
| Natural rubber, Sheets Defo 1250 | 50 |
| SBR 1707 | 41.25 |
| cis-1,4-Polybutadiene | 20 |
| FEF [Fast Extruding Furnace] carbon black | 40 |
| Light plasticizer oil | 13.75 |
| Zinc oxide | 3 |
| Stearic acid | 2 |
| Sulfur | 3 |
| "Vulkacit" CZ (N-cyclohexylbenzothiazole sulfenamide) | 1.3 |

TABLE 2

| RUBBER | POLYOCTEN-AMER | RAW TENSILE STRENGTH kg./cm² | ELONGA-TION % | DEFO ACC. to DIN 53 514 | |
| --- | --- | --- | --- | --- | --- |
| | | | | 20° C. | 80° C. |
| 2a Synthetic Polyisoprene (Ziegler Type) Commercial Product "Natsyn" 2200 | None | 1.7 | 132 | 2000/11 | 700/10 |
| 2b do. | 15 Parts by Wt. | 4.0 | 89 | 5500/18 | 600/6 |
| 2c Synthetic Polyisoprene Li Type, Commercial Product "Cariflex" IR 305 | None | 1.7 | 140 | 2450/13 | 900/8 |
| 2d do. | 15 Parts by Wt. | 3.6 | 63 | 5500/15 | 640/6 |
| 2e SBR 1712 | None | 3.8 | 104 | 5750/22 | 1500/18 |
| 2f do. | 15 Parts by Wt. | 4.7 | 119 | 8250/28 | 1320/20 |
| 2g SBR 1707 | None | 3.2 | 177 | 4500/34 | 1500/26 |
| 2h do. | 15 Parts by Wt. | 4.9 | 129 | 7500/32 | 1400/26 |
| 2i cis-1,4-Polybutadiene Commercial Product "Buna" CB 30 | None | 2.2 | 367 | 2400/34 | 1300/28 |
| 2j do. | 15 Parts by Wt. | 7.2 | 263 | 4600/37 | 1300/27 |

The properties of the elastomeric mixtures and the vulcanizates with and without addition of polydodecenamer are set forth in Table 3. In addition to advantages in the processing operation for the elastomeric mixtures according to this invention as shown by defo values at 20° C. and 40° C. and raw tensile strength, no disadvantageous effects on the vulcanizate results.

than 4,000, wherein the elastomer therein has a deformation hardness of from 2,000 to 4,000 at 20° C.

6. A vulcanizable elastomeric mixture according to claim 1 having a deformation hardness at 20° C. of from 5,000 to 9,000, wherein the elastomer therein has a deformation hardness of from 2,000 to 4,000 at 20° C.

TABLE 3

|  | Mixture[3A] Without Polydodecenamer | | | | Mixture[3B] 10% Polydodecenamer | | | | Mixture[3C] 15% Polydodecenamer | | | |
| --- | --- | --- | --- | --- | --- | --- | --- | --- | --- | --- | --- | --- |
| Unvulcanized tensile strength (kg. cm$^2$) | 2.6 | | | | 3.9 | | | | 4.5 | | | |
| Mixture defo | | | | | | | | | | | | |
| 20° C. | 3700/25 | | | | 5750/38 | | | | 6500/36 | | | |
| 40° C. | 1750/31 | | | | 3400/29 | | | | 4400/32 | | | |
| 80° C. | 850/35 | | | | 850/39 | | | | 760/32 | | | |
| Vulcanization at 143° C., minutes | 15' | 30' | 60' | 120' | 15' | 30' | 60' | 120' | 15' | 30' | 60' | 120' |
| Tensile strength kg./cm$^2$ | 168 | 145 | 128 | 125 | 162 | 156 | 151 | 135 | 169 | 168 | 135 | 128 |
| Elongation % | 544 | 402 | 372 | 380 | 534 | 424 | 418 | 402 | 514 | 436 | 366 | 372 |
| Modulus 300 % (kg./cm$^2$) | 61 | 92 | 92 | 86 | 66 | 95 | 95 | 88 | 78 | 99 | 101 | 95 |
| Impact strength according to Pohle | 20 | 10 | 9 | 9 | 18 | 12 | 12 | 8 | 18 | 15 | 9 | 8 |
| Hardness ° Shore | | | | | | | | | | | | |
| 20° C. | 52 | 57 | 57 | 54 | 56 | 58 | 58 | 56 | 59 | 61 | 61 | 60 |
| 75° C. | 51 | 56 | 56 | 54 | 51 | 55 | 55 | 54 | 55 | 56 | 56 | 55 |
| Elasticity | | | | | | | | | | | | |
| 20° C. | 60 | 62 | 62 | 60 | 58 | 61 | 61 | 59 | 58 | 62 | 60 | 58 |
| 75° C. | 62 | 66 | 66 | 65 | 60 | 66 | 65 | 65 | 62 | 67 | 66 | 65 |
| Compression set | 16 | | | | 15 | | | | 18 | | | |
| DIN Abrasion (mm$^3$) | 156 | | | | 145 | | | | 154 | | | |
| Goodrich Flexometer ($\Delta T$) | 11.5 | | | | 11.0 | | | | 12.0 | | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Vulcanizable elastomeric mixtures comprising an elastomer having a deformation hardness of less than 6,000 at 20° C. and an amount, from 2–20 percent by weight, based on the elastomer, effective to impart a deformation hardness to the elastomeric mixture which is substantially greater than the deformation hardness of the elastomer, of a polyoctenamer, a polydodecenamer or a mixture thereof, whose double bonds are more than 60 percent in the trans-configuration and which has a reduced viscosity of 0.2 – 3.0 dl./g. at 135° C.

2. A vulcanizable elastomeric mixture according to claim 1 containing 5–15 percent of a polyoctenamer having double bonds which are 75–95 percent in the trans-configuration.

3. A vulcanizable elastomeric mixture according to claim 1 containing 5–15 percent of a polydodecenamer having double bonds which are 75–95 percent in the trans-configuration.

4. A vulcanizable elastomeric mixture according to claim 1 wherein the elastomer is selected from the group consisting of natural rubber, polyisoprene, styrene-butadiene rubber and cis-1,4-polybutadiene.

5. A vulcanizable elastomeric mixture according to claim 1 having a deformation hardness at 20° of more than 4,000.

7. A cross-linked vulcanizate of the elastomeric mixture according to claim 5, having a deformation hardness at 20° C. of more than 4,000.

8. A method of increasing the deformation hardness of a vulcanizable elastomeric mixture whose elastomer has a deformation hardness at 20° C. of less than 6,000, which comprises incorporating therein an amount from 2–20 percent by weight, based on the elastomer, effective to impart a deformation hardness to the elastomeric mixture which is substantially greater than the deformation hardness of the elastomer, of a polyoctenamer, a polydodecenamer or a mixture thereof, whose double bonds are more than 60 percent in the trans-configuration and which has a reduced viscosity of 0.2 – 3.0 dl./g. at 135° C.

9. A method according to claim 8 wherein a polyoctenamer having double bonds which are 75–95 percent in the trans-configuration is incorporated therein.

10. A method according to claim 8 wherein a polydodecenamer having double bonds which are 75–95 percent in the trans-configuration is incorporated therein.

11. A method according to claim 8 wherein 5–15 percent of the polyoctenamer, polydodecenamer or mixture thereof is incorporated therein.

12. A method according to claim 8 wherein the elastomer is selected from the group consisting of natural rubber, polyisoprene, styrene-butadiene rubber and cis-1,4-polybutadiene.

13. An article of manufacture comprising an unvulcanized automobile tire formed of an elastomeric mixture according to claim 5.

14. An article of manufacture comprising an unvulcanized automobile tire formed of an elastomeric mixture according to claim 6.

* * * * *